(12) United States Patent
Wagman et al.

(10) Patent No.: US 10,062,492 B2
(45) Date of Patent: Aug. 28, 2018

(54) INDUCTION COIL HAVING A CONDUCTIVE WINDING FORMED ON A SURFACE OF A MOLDED SUBSTRATE

(71) Applicant: Apple Inc., Cupertino, CA (US)

(72) Inventors: Daniel C. Wagman, Cupertino, CA (US); Eric S. Jol, Cupertino, CA (US); Ibuki Kamei, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 14/256,603

(22) Filed: Apr. 18, 2014

(65) Prior Publication Data

US 2015/0302971 A1    Oct. 22, 2015

(51) Int. Cl.

| H01F 5/00 | (2006.01) |
|---|---|
| H01F 27/28 | (2006.01) |
| H02J 7/02 | (2016.01) |
| H01F 41/04 | (2006.01) |
| H02J 50/40 | (2016.01) |
| H02J 50/70 | (2016.01) |
| H02J 50/90 | (2016.01) |
| H02J 50/10 | (2016.01) |
| B29C 45/14 | (2006.01) |

(Continued)

(52) U.S. Cl.
CPC ... *H01F 27/2804* (2013.01); *B29C 45/14467* (2013.01); *B29C 45/14639* (2013.01); *H01F 27/365* (2013.01); *H01F 38/14* (2013.01); *H01F 41/041* (2013.01); *H02J 5/005* (2013.01); *H02J 7/025* (2013.01); *H02J 50/10* (2016.02); *H02J 50/40* (2016.02); *H02J 50/70* (2016.02); *H02J 50/90* (2016.02); *B29K 2105/16* (2013.01); *B29K 2995/0005* (2013.01); *B29L 2031/34* (2013.01); *B29L 2031/3481* (2013.01); *H02J 7/0042* (2013.01)

(58) Field of Classification Search
CPC .................................. H01F 5/00; H01F 27/28
USPC .................................................. 336/200, 232
See application file for complete search history.

(56) References Cited

U.S. PATENT DOCUMENTS

| 4,612,467 A | 9/1986 | Clegg |
| 5,198,647 A * | 3/1993 | Mizuta ............. G06K 19/07749 |
| | | 235/449 |

(Continued)

FOREIGN PATENT DOCUMENTS

| CN | 101867203 | 10/2010 |
| CN | 102377250 | 3/2012 |

(Continued)

*Primary Examiner* — Tsz Chan
(74) *Attorney, Agent, or Firm* — Kilpatrick Townsend & Stockton LLP (57) ABSTRACT

The following examples and embodiments are directed to an induction coil that can be used in a variety of applications, including, for example, induction charging systems. In one example, an induction coil is configured to couple an electrical field between a base device and a mobile device in an inductive charge system. The induction coil includes a coil substrate formed by a molding process. The induction coil also includes a shield element disposed within the coil substrate. The shield element may be formed within the coil substrate as part of the molding process. A conductive winding is also formed within a surface of the coil substrate. In some cases, the coil substrate is formed by an injection-molding process.

22 Claims, 9 Drawing Sheets

(51) Int. Cl.
*H02J 5/00* (2016.01)
*H01F 27/36* (2006.01)
*H01F 38/14* (2006.01)
*B29L 31/34* (2006.01)
*B29K 105/16* (2006.01)
*H02J 7/00* (2006.01)

(56) References Cited

U.S. PATENT DOCUMENTS

| | | | |
|---|---|---|---|
| 5,305,961 A | 4/1994 | Errard et al. | |
| 5,719,483 A | 2/1998 | Abbott et al. | |
| 6,975,198 B2 | 12/2005 | Baarman et al. | |
| 7,180,265 B2 | 2/2007 | Naskali et al. | |
| 7,948,208 B2 | 5/2011 | Partovi et al. | |
| 7,952,322 B2 | 5/2011 | Partovi et al. | |
| 8,169,185 B2 | 5/2012 | Partovi et al. | |
| 8,193,769 B2 | 6/2012 | Azancot et al. | |
| 8,229,356 B2 | 7/2012 | Kawamura | |
| 8,482,160 B2 | 7/2013 | Johnson et al. | |
| 8,587,516 B2 | 11/2013 | Kopychev et al. | |
| 8,629,652 B2 | 1/2014 | Partovi et al. | |
| 8,629,654 B2 | 1/2014 | Partovi et al. | |
| 8,754,609 B2 | 6/2014 | Tsai et al. | |
| 8,796,989 B2 | 8/2014 | Lee et al. | |
| 8,844,817 B2 | 9/2014 | Glanzer et al. | |
| 8,845,590 B2 | 9/2014 | Ash | |
| 8,890,369 B2 | 11/2014 | Baarman et al. | |
| 8,896,264 B2 | 11/2014 | Partovi | |
| 8,901,881 B2 | 12/2014 | Partovi | |
| 8,912,686 B2 | 12/2014 | Stoner et al. | |
| 8,922,065 B2 | 12/2014 | Sun et al. | |
| 8,922,162 B2 | 12/2014 | Park et al. | |
| 8,947,041 B2 | 2/2015 | Cook et al. | |
| 8,947,042 B2 | 2/2015 | Kirby et al. | |
| 8,947,047 B2 | 2/2015 | Partovi et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,118,193 B2 | 8/2015 | Yeh | |
| 9,124,308 B2 | 9/2015 | Metcalf et al. | |
| 9,160,204 B2 | 10/2015 | Yeh | |
| 9,178,369 B2 | 11/2015 | Partovi | |
| 9,190,849 B2 | 11/2015 | Won et al. | |
| 2005/0288743 A1* | 12/2005 | Ahn | A61N 1/3787 607/61 |
| 2006/0049481 A1 | 3/2006 | Tiemeijer | |
| 2007/0063807 A1* | 3/2007 | Quilici | H01F 17/0033 336/223 |
| 2007/0200748 A1* | 8/2007 | Hoegerl | H01L 23/3128 342/85 |
| 2009/0267559 A1* | 10/2009 | Toya | H02J 7/025 320/108 |
| 2009/0325651 A1* | 12/2009 | Kondo | H02J 7/025 455/573 |
| 2010/0181842 A1* | 7/2010 | Suzuki | H02J 5/005 307/104 |
| 2010/0253153 A1 | 10/2010 | Kondo et al. | |
| 2011/0050164 A1 | 3/2011 | Partovi et al. | |
| 2011/0143556 A1 | 6/2011 | Hsu | |
| 2011/0221385 A1 | 9/2011 | Partovi et al. | |
| 2012/0098484 A1 | 4/2012 | Cheng et al. | |
| 2012/0146576 A1* | 6/2012 | Partovi | H01F 7/0252 320/108 |
| 2012/0274434 A1* | 11/2012 | Lim | H01F 19/04 336/200 |
| 2013/0026981 A1 | 1/2013 | Van Der Lee et al. | |
| 2013/0027252 A1* | 1/2013 | Lin | H01Q 1/38 343/700 MS |
| 2013/0038135 A1* | 2/2013 | Ichikawa | B60L 11/182 307/104 |
| 2013/0038418 A1* | 2/2013 | Yang | H01L 23/48 336/200 |
| 2013/0069595 A1 | 3/2013 | Rejman et al. | |
| 2013/0119926 A1 | 3/2013 | Lin | |
| 2013/0093388 A1 | 4/2013 | Partovi | |
| 2013/0099563 A1 | 4/2013 | Partovi et al. | |
| 2013/0107126 A1 | 5/2013 | Nonomura et al. | |
| 2013/0127252 A1 | 5/2013 | Yerazunis et al. | |
| 2013/0127406 A1 | 5/2013 | Winger et al. | |
| 2013/0234899 A1* | 9/2013 | Pope | H01Q 1/243 343/702 |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2014/0021909 A1 | 1/2014 | Klawon et al. | |
| 2014/0083997 A1 | 3/2014 | Chen et al. | |
| 2014/0103873 A1 | 4/2014 | Partovi et al. | |
| 2014/0132210 A1 | 5/2014 | Partovi | |
| 2014/0191568 A1 | 7/2014 | Partovi | |
| 2014/0206372 A1 | 7/2014 | Zeng et al. | |
| 2014/0306654 A1 | 10/2014 | Partovi | |
| 2015/0102892 A1* | 4/2015 | Yeo | H01F 1/14716 336/200 |
| 2015/0122884 A1* | 5/2015 | Takeuchi | G06K 7/10336 235/439 |
| 2015/0130412 A1 | 5/2015 | Partovi | |
| 2015/0145475 A1 | 5/2015 | Partovi et al. | |
| 2015/0287527 A1 | 10/2015 | Kasar | |
| 2015/0311740 A1 | 10/2015 | Hilario et al. | |
| 2016/0064137 A1 | 3/2016 | Perez et al. | |
| 2016/0094076 A1 | 3/2016 | Kasar | |
| 2016/0094078 A1 | 4/2016 | Graham et al. | |

FOREIGN PATENT DOCUMENTS

| | | |
|---|---|---|
| CN | 103168405 | 6/2013 |
| CN | 103378639 | 10/2013 |
| EP | 2535906 | 12/2012 |
| EP | 2597747 | 5/2013 |
| EP | 2621050 | 7/2013 |
| EP | 2693591 | 2/2014 |
| FR | 2883428 | 9/2006 |
| JP | 58087804 A * | 5/1983 |
| JP | 08079976 A * | 3/1996 |
| JP | 2008210862 A * | 9/2008 |
| JP | 2011187559 A * | 9/2011 |
| WO | WO03/105311 | 12/2003 |
| WO | WO2013/165167 | 11/2013 |

* cited by examiner

SECTION B-B

SECTION C-C
FIG. 6

FIG. 9

INDUCTION COIL HAVING A CONDUCTIVE WINDING FORMED ON A SURFACE OF A MOLDED SUBSTRATE

TECHNICAL FIELD

This disclosure generally relates to electromagnetic coils, and in particular to a molded electromagnetic coil having a shield element formed into a coil substrate and a conductive winding formed into the surface of the substrate.

BACKGROUND

Traditionally, induction coils are formed from one or more wire windings wrapped around a solid core or base material. By passing an alternating electric current through the wire windings, an electromagnetic field may be generated around the induction coil. The electromagnetic field produced by the coil may be used to induce current flow in other components that are within the field and may be used to transfer power between two or more components. Induction coils may also be used as inductor elements in an electrical circuit to provide a frequency-dependent impedance or reactance. In some cases, the coil may be isolated from other electrical components by a shield made of a ferromagnetic material.

Traditional induction coils are somewhat limited by the geometric shapes that can be formed using traditional techniques. In particular, traditional ferromagnetic materials may be brittle and difficult to form into contoured or irregular shapes. Additionally, the geometric limitations of traditional induction coils may limit the location where the induction coil may be placed in a housing or enclosure. Thus, there is a need for a functional induction coil that can be formed into a variety of shapes to conform with a desired contour or fit within a housing having limited space. The devices and techniques described herein may be used to form an induction coil in a desired shape without some of the drawbacks of some traditional induction coils.

SUMMARY

The following examples and embodiments are directed to an induction coil that can be used in a variety of applications, including, for example, an inductive charging system. In one example embodiment, an induction coil is configured to couple an electrical field between a mobile device and a base device of an inductive charge system. The induction coil includes a coil substrate formed by a molding process. The induction coil also includes a shield element disposed within the coil substrate. The shield element may be formed within the coil substrate as part of the molding process. A conductive winding is also formed within a surface of the coil substrate. In some cases, the coil substrate is formed by an injection-molding process. In one example, the substrate is formed from a thermoplastic material that is doped with a conductive particulate.

The conductive winding may be formed by activating a region of the surface of coil substrate. In some cases, the region is activated using a laser beam that is focused on the surface of the coil substrate. In some cases, the conductive winding is formed by depositing a conductive coating on the region to form a solid conductive trace.

In some embodiments, the surface of the coil substrate having the conductive winding formed thereon is contoured in shape. The induction coil may also have an external surface that is contoured in shape, and substantially conforms to a mating surface of the base device. In some cases, the mating surface of the base device is an internal surface of a housing device.

In one example, the induction coil includes a plurality of shield elements arranged in a circular pattern. Each shield element may be formed within the coil substrate as part of an injection-molding process and each of the shield elements may have a semi-circle or arc shape. The shield element may be formed from a ferromagnetic material, including an electrical steel laminate material.

Some embodiments are directed to a method of forming a molded induction coil. A shield element is inserted into a cavity of a mold. A coil substrate is formed around the shield element. One or more winding may be formed in a surface of the coil substrate. The coil substrate may be formed, for example, using an injection-molding process. The process may include: injecting a molten material into the cavity of the mold; immersing the shield element in the molten material; and curing the molten material to form the coil substrate. In one example, the coil substrate is formed from a thermoplastic material that is doped with a conductive particulate.

In one example, the molded induction coil is configured to couple an electrical field between a base device and a mobile device in an inductive charge system. In particular, the molded induction coil may be installed into a housing of a mobile device and used to charge a battery of the mobile device, using the molded induction coil to couple electrical power between the mobile device and a base device.

DETAILED DESCRIPTION

The following embodiments are related to an inductive charging system. More specifically, the examples provided herein are directed to a charging system having an induction coil formed from an injection-molded part. By injection molding the induction coil, a wider range of form factors and geometries can be achieved as compared to traditional metal induction coils. Additionally, if the induction coil is injection molded using suitable materials, conductive traces may be formed on one or more surfaces of the coil, reducing or eliminating the need for a separate wire-wrapped winding element. In some cases, the injection-molded induction coil includes one or more ferromagnetic shield elements that are molded into the base of the coil. The shield elements may be configured to shape the electromagnetic field produced by the coil. The shield elements may also be configured to substantially shield other electrical components from the electromagnetic fields that are generated by the induction coil. In some cases, the shield elements are configured to reduce internal eddy currents.

For purposes of the description of the following examples, an induction coil may refer to a coil assembly, including, for example, a body (substrate), a shield element, and one or more conductive windings combined to form an electrically inductive part. In some cases, the shield element is formed into the body of the coil. Also, in some cases, the body functions as the shield element. For purposes of the description of the following example embodiments, an induction coil that has been formed by an injection molding process may be generally referred to as an injection-molded induction coil, a molded injection coil, or simply a molded coil.

Figure 1:
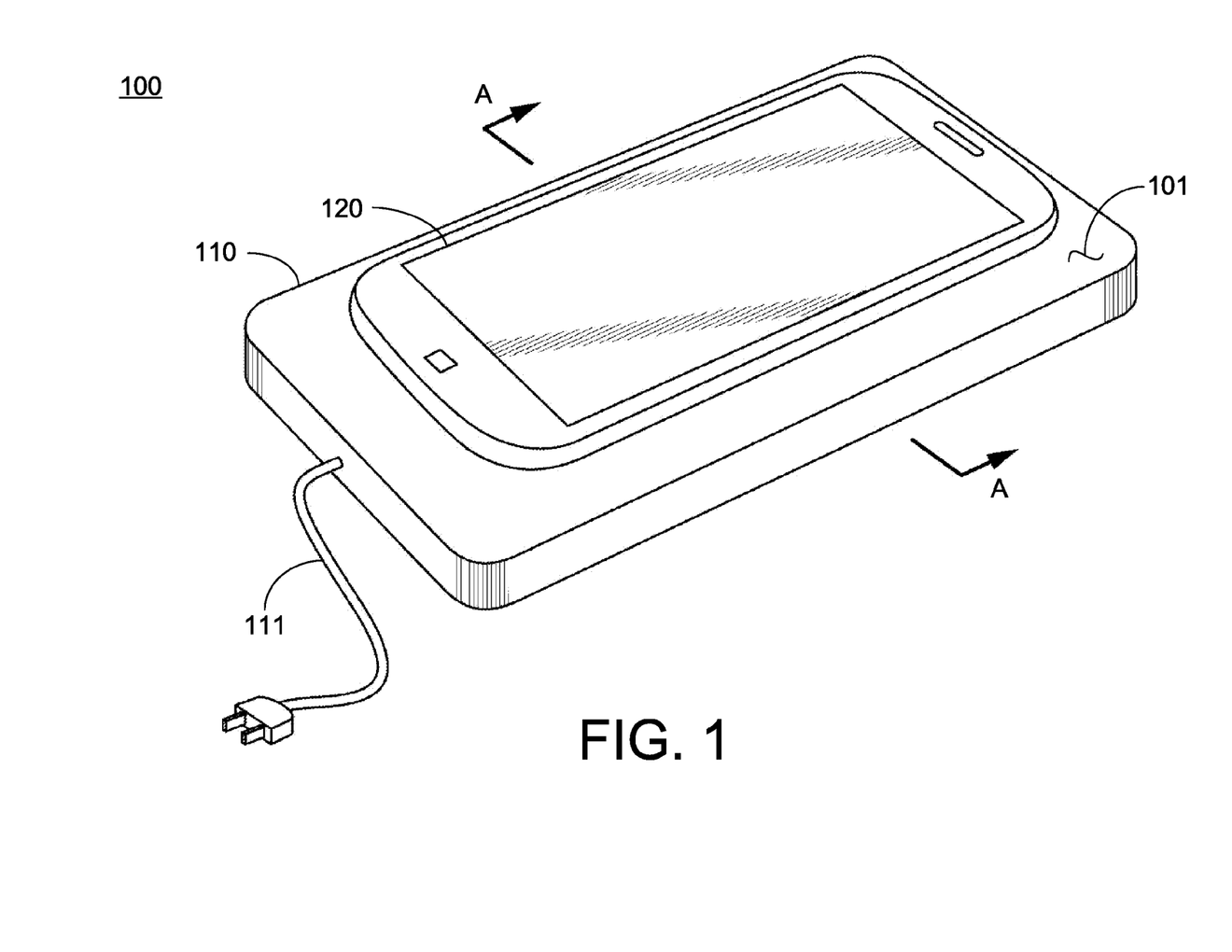
FIG. 1 depicts an example inductive charging system.

FIG. 1 depicts an example of a wireless inductive charging system. As shown in FIG. 1, the inductive charging system 100 includes a base device 110 having an upper surface configured to interface with a mobile device 120. The mobile device 120 may be placed on the upper surface of the base device 110 during a charging or docking operation. Both the base device 110 and the mobile device 120 are configured to transfer electrical power via an inductive coupling interface that facilitates an electrical power transfer between the two components. One advantage of a system, as shown in FIG. 1, is that a wired interface or cable connection is not necessary to perform an electrical charging operation. Additionally, the inductive coupling interface can be used to facilitate electrically communication or data transmission between the base device 110 and the mobile device 120.

In the present example, the base device 110 is a charging station for the mobile device 120. That is, one of the primary functions of the base device 110 is to provide battery-charging power to the mobile device 110. As shown in FIG. 1, the base device 110 includes a power cable 111 that is configured for electrical connection to a traditional AC wall outlet. In alternative embodiments, the base device 110 may provide additional functionality, including, for example, data transmission between the mobile device 120 and the base device 110, data transmission between the mobile device 120 and an external computer or computer network, or facilitate transmission of other electrical signals between the base device 110 and the mobile device. Additionally, the base device 110 may be integrated with one or more additional devices or electrical appliances.

In this example, the mobile device 120 is a personal mobile device having an internal battery power source. The mobile device 120 is configured to receive a charge from an external source and to operate using the internal battery power for an extended period of time. In the present example, the mobile device 120 may be disposed on an interface surface 101 of the base device 110 and receive electrical power from the base device 110 via an inductive coupling interface. In some cases, the interface surface 101 includes one or more alignment features to locate the mobile device 120 with respect to the base device 110. When the internal battery of the mobile device 120 is at least partially charged, the mobile device 120 may be removed from the base device 110 and used for a period of time without requiring connection to an external power source. Examples of a mobile device 120 include, without limitation, a mobile telephone device, a wearable timekeeping device, a health-monitoring device, a navigation device, a media player device, a wireless telephone handset, a tablet computer system, or a laptop computer system.

Figure 2:
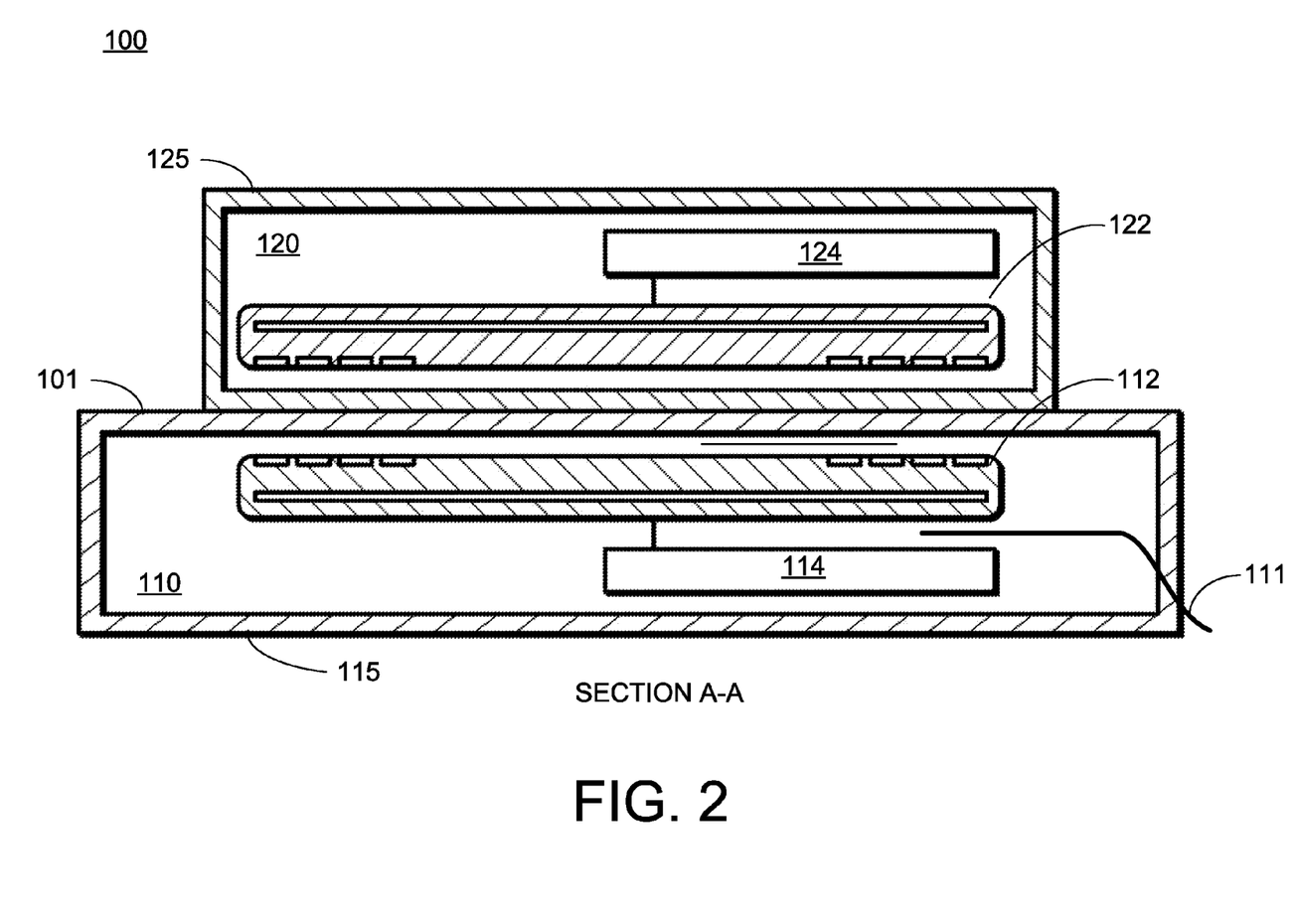
FIG. 2 depicts a cross-sectional view of an example inductive charging system.

FIG. 2 depicts a cross-sectional view of an example inductive charging system. In particular, FIG. 2 depicts the inductive charging system 100 of FIG. 1 taken along Section A-A. As shown in FIG. 2, the inductive charging system 100 includes a base device 110 configured to physically interface or dock with the mobile device 120 along an interface surface 101 of the base device 110. The mobile device 120 may also have a surface that is specially configured to mechanically interface with the interface surface 101 of the base device 110. As mentioned previously, there may be one or more alignment features that facilitate alignment of the mobile device 120 with respect to the base device 110.

As shown in FIG. 2, at least one induction coil is located on either side of the interface between the base device 110 and the mobile device 120. In this example, the inductive charging system 100 includes a mobile induction coil 122 disposed within a housing 125 of the mobile device 120. The inductive charging system 100 also includes a base induction coil 112 disposed within a housing 115 of the base device 110. In the present example, both the mobile induction coil 122 and the base induction coil 112 are injection-molded induction coils. An example injection-molded coil is described in more detail below with respect to FIGS. 3 and 4.

In the present example, the base induction coil 112 is configured to create an electromagnetic field that extends beyond the housing 115 of the base device 110. More specifically, the base induction coil 112 is configured to inductively couple to the mobile induction coil 122, when the mobile device 120 is located proximate to the interface surface 101, as shown in FIG. 2. The electromagnetic field created by the base induction coil 112 induces a current flow in the mobile induction coil 122, facilitating electrical power transfer between the base device 110 and the mobile device 120.

It may be generally advantageous that the two induction coils be positioned as close together as possible to facilitate inductive coupling between the two components. In particular, it may be advantageous for the shape of the coils to substantially conform to the shape of the mechanical interface between the base device 110 and the mobile device 120. It may be also advantageous that the two induction coils occupy a relatively small space within the respective housing in order to reduce the size and bulk of the components. As described in more detail with respect to FIGS. 3-7, a molded induction coil may be well suited for achieving these and other objectives.

As shown in FIG. 2, the base device 110 includes a drive circuit 114 that is electrically coupled to the base induction coil 112. In this example, the drive circuit 114 is also electrically coupled to an external power source via the power cable 111. The drive circuit 114 may be configured to receive AC power received from an external source, such as an AC power outlet, and provide a drive current to the base induction coil 112. The drive circuit 114 may also be configured to detect the presence of the mobile device 125 and initiate and/or terminate a charging operation. The drive circuit 114 may also include control electronics, including, for example, a microprocessor and computer memory that can be used to control the drive current provided to the base induction coil 112. In some cases the drive current can be controlled to deliver a variable or configurable charging operation. In some cases, the drive circuit 114 may receive electronic signals from the mobile device 120 via the inductive interface between the base induction coil 112 and the mobile induction coil 122. The drive circuit 114 may initiate, terminate, or change a charging operation in response to an electronic signal received from the mobile device 120.

In some examples, the base device 110 includes other components that interface with the base induction coil 112 and/or the integrated into the drive circuit 114. For example, the base device 110 may also include one or more computer communication elements for transferring data between an external computer and the base device 110. The one or more communication elements may also be configured to transfer data using a TCP/IP, wireless or other communication protocol. In some cases, the computer communication element is also configured to wirelessly transfer data to the mobile device 120.

As shown in FIG. 2, the base device 110 also includes a housing 115, which encloses many of the components of the base device 110. In FIG. 2, the housing 115 is depicted as having a generally rectangular shape. However, in other examples, the housing 115 may have one or more contoured surfaces that may be formed from one or more injection-molded parts. The contoured surfaces may serve a cosmetic purpose or may also provide a functional use. As previously discussed, it may be advantageous for the induction coils to substantially conform to a surface of the housing to improve the inductive coupling between the base device 110 and the mobile device 120. In this example, the base induction coil 112 substantially conforms with the interface surface 101 of the base device 110. While the interface surface 101 in this example is substantially flat, the interface surface in other examples may be contoured in shape. An example of a housing having a contoured interface surface is provided below with respect to FIGS. 5 and 6 (element 501).

As shown in FIG. 2, the mobile device 120 also includes other components. In particular, the mobile device 120 includes power circuitry 124, which is electrically connected to the mobile induction coil 122. The power circuitry 124 may include one or more power storage elements, such as a rechargeable battery or other form of electrical power storage. The power circuitry 124 may also include electrical power conditioning circuits for converting the AC power received by the induction coil 122 into DC power or AC power having different electrical characteristics. In general, the power circuitry 124 is also coupled to one or more power consuming circuits or elements, including, for example, a computer processor, computer memory, a display screen, or other electrical subsystem of the mobile device 120.

In some cases, a shield element of the mobile or base induction coil 112, 122 substantially shields the electrical components of the mobile device 120 and/or the base device 110 from the electromagnetic fields produced by one or both of the mobile induction coil 122 and the base induction coil 112. The shield element may also shape the electromagnetic field between the mobile induction coil 122 and the base induction coil 112 and facilitate efficient inductive coupling between the two devices.

While the present inductive charging system example is provided with respect to a mobile device, a similar inductive power transfer system can be used to transfer power between two or more components. For example, a similar configuration may include an inductive power transfer between two mobile devices. Additionally, a configuration similar to the example provided above may be used to inductively couple two or more devices to transmit data, electrical signals, or other information between devices. In some cases, the base and/or mobile devices include multiple induction coils that can be used to electrically couple the two devices.

Figure 3:
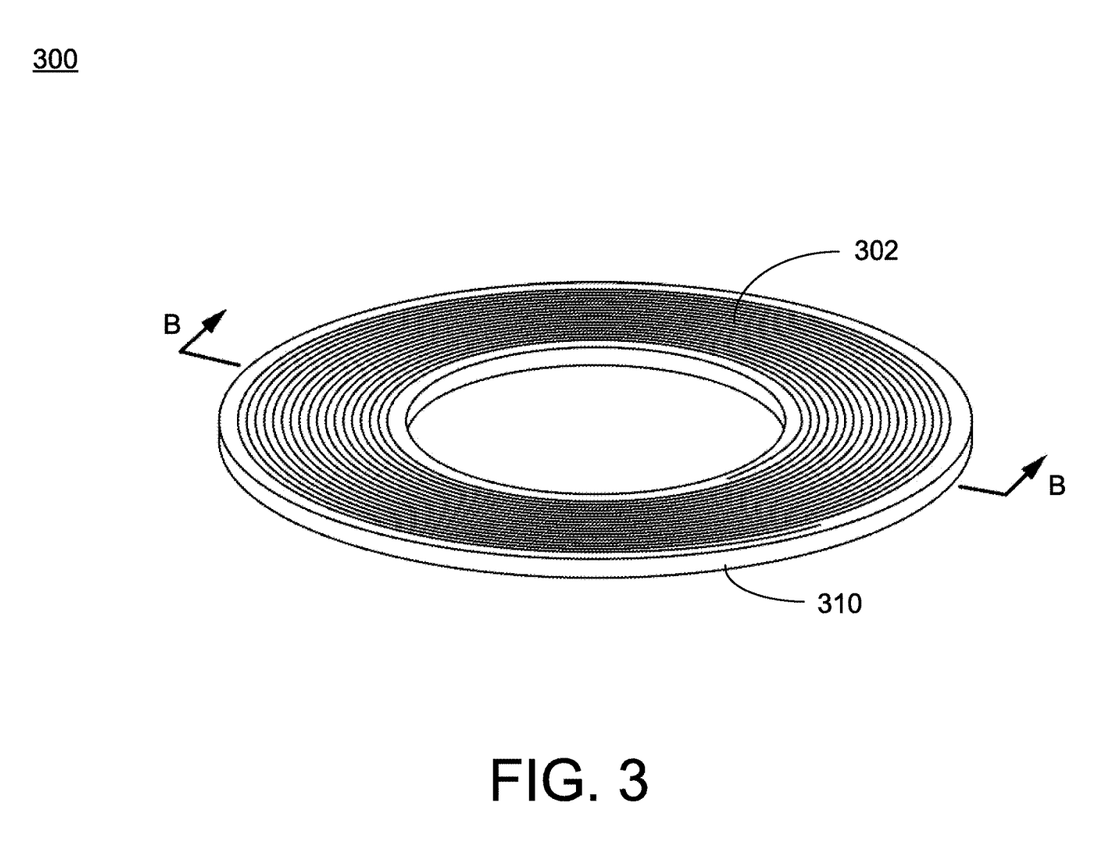
FIG. 3 depicts an example molded coil of an inductive charging system.

FIG. 3 depicts an example molded coil that can be used to transmit and receive electrical power, data, and other types electrical signals. In particular, the example molded coil 300 of FIG. 3 can be used as either the base induction coil 112 or the mobile induction coil 122 of FIG. 2, discussed above.

In the present example, the molded coil 300 is formed using an injection molding process. In particular, the molded coil 300 may be formed by injecting a molten or liquid material into a cavity of a mold or form and then cured into a solid part otherwise referred to as a coil substrate 310. In a typical injection-molding process, the material is injected under pressure into a mold cavity, where it is rapidly cooled or cured to form the coil substrate 310. However, the coil substrate 310 may be formed using a variety of other forming processes, including, for example, open pour casting, vacuum forming, and the like. The coil substrate 310 may also be formed from chemical reaction between two or more materials that are injected into a mold or cavity also referred to as a reaction-injection molding process.

Example materials that can be used to form the coil substrate 310 of the molded coil 300, include, for example, doped polymer materials. In some cases, it may be advantageous to use a material, such as a thermoplastic or thermoset material, that is doped with a conductive particulate to facilitate electromagnetic shielding using the coil substrate 310.

In the present example, a conductive winding 302 is formed on a surface of the coil substrate 310. The conductive winding 302 may include one or more conductive traces on the surface of the coil substrate 310. The conductive traces of the winding may be formed by first treating the region of the conductive trace and then coating or plating the region with a conductive material. In one example, a region of the coil substrate 310 is activated using a laser beam focused on the surface of the substrate. If the coil substrate 310 is formed from a suitable material, the laser activation prepares the surface of the coil substrate for a subsequent plating or coating process. In some examples, an electroless copper or nickel plating process is used to deposit conductive material on the activated region to form a solid conductive trace. By directing a focused beam of the laser along the surface of the coil substrate 310, a wide variety of conductive trace geometries can be created.

In this example, a conductive winding 302 is formed on the top surface of the coil substrate 310 from a single conductive trace having a continuous spiral shape. The generally circular shape of the winding 302 formed around a toroidal-shaped or disk-shaped coil substrate 310 may be used to produce an electromagnetic field sufficient to couple to another induction coil. For example, the geometry of the molded coil 300 and the conductive winding 302 may be configured to generate an electromagnetic field when an alternating current is passed through the winding 302. The resulting electromagnetic field may extend beyond a housing enclosing the molded coil 300 and coupled to another induction coil that is proximate to the surface of the housing (see, for example, the inductive charging system of FIGS. 1 and 2). In other examples, the conductive winding 302 may be formed from multiple conductive traces and/or formed on multiple surfaces of the coil substrate 310 to further facilitate the production of an electromagnetic field having the desired shape and electrical properties.

Figure 4:
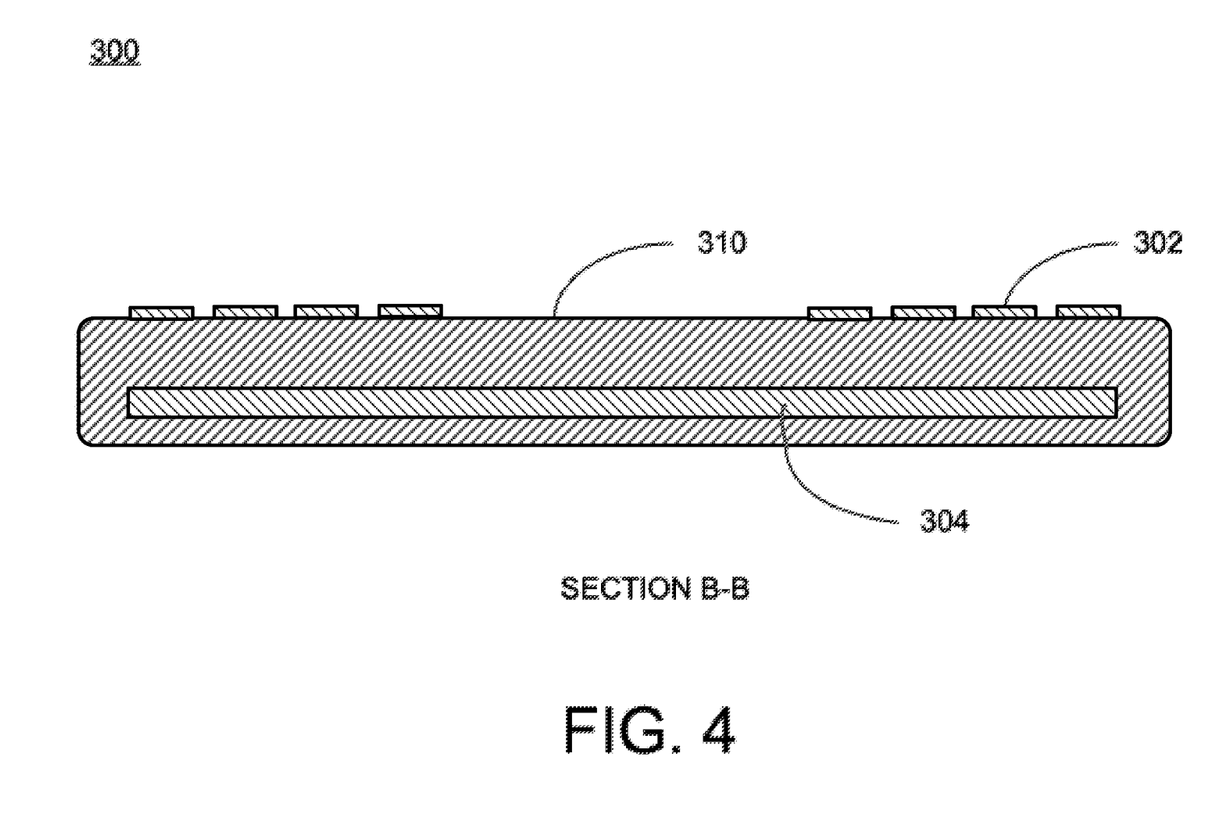
FIG. 4 depicts a cross-sectional view of an example molded coil.

Other elements may also be formed into the coil substrate 310 to improve the performance of the molded coil when integrated into a device. In the present example, a shield element is formed into the coil substrate 310 to help shape the electromagnetic field produced by the molded coil 300 and also substantially isolate or shield other electrical components of the device from the electromagnetic field. FIG. 4 depicts a cross-sectional view of an example molded coil 300 taken along section B-B. As shown in FIG. 4, the molded coil 300 includes a shield element 304 that is disposed with the coil substrate 310. The shield element 304 may be formed from a magnetic material, including materials that may be referred to as soft magnetic materials. Example materials that can be used to form the shield element 304 include, without limitation, cobalt steel, electric steel, nickel, iron, magnesium, as well as other ferromagnetic materials.

As shown in FIG. 4, the shield element 304 is formed into the coil substrate 310. In one example, the shield element 304 is formed into the coil substrate 310 as part of an injection molding process. For example, the shield element 304 may be inserted into a cavity of an injection mold before or during the injection molding process. In this case, molten or liquid material is injected into the cavity and surrounds the inserted shield element 304. As the material cools or cures, the shield element 304 remains embedded in the coil substrate 310. Alternatively, the shield element 304 may also be formed into the coil substrate 310 using other molding processes, including, without limitation, open pour casting, vacuum forming, reaction-injection molding, and the like.

As also shown in FIG. 4, the molded coil 300 includes a conductive winding 302 formed within a surface of the coil substrate 310. As previously discussed, the conductive winding 302 may be formed by treating a region of the coil substrate 310 and plating or coating the region with a conductive material. In some cases, a laser beam is used to activate a region on the surface of the coil substrate 310 and conductive metal (e.g., copper, nickel, silver) is deposited on the activated region. One advantage to forming the conductive winding in this way is that the winding can be formed directly on coil substrate 310 and may be formed in a wide variety of geometries or configurations.

In some cases, one or more additional layers may be formed over the conductive windings 302 and other portions of the surface of the coil substrate 310. In one example, a polyurethane or other protective coating is applied to the molded coil 300 after the conductive windings 302 have been formed.

Figure 5:
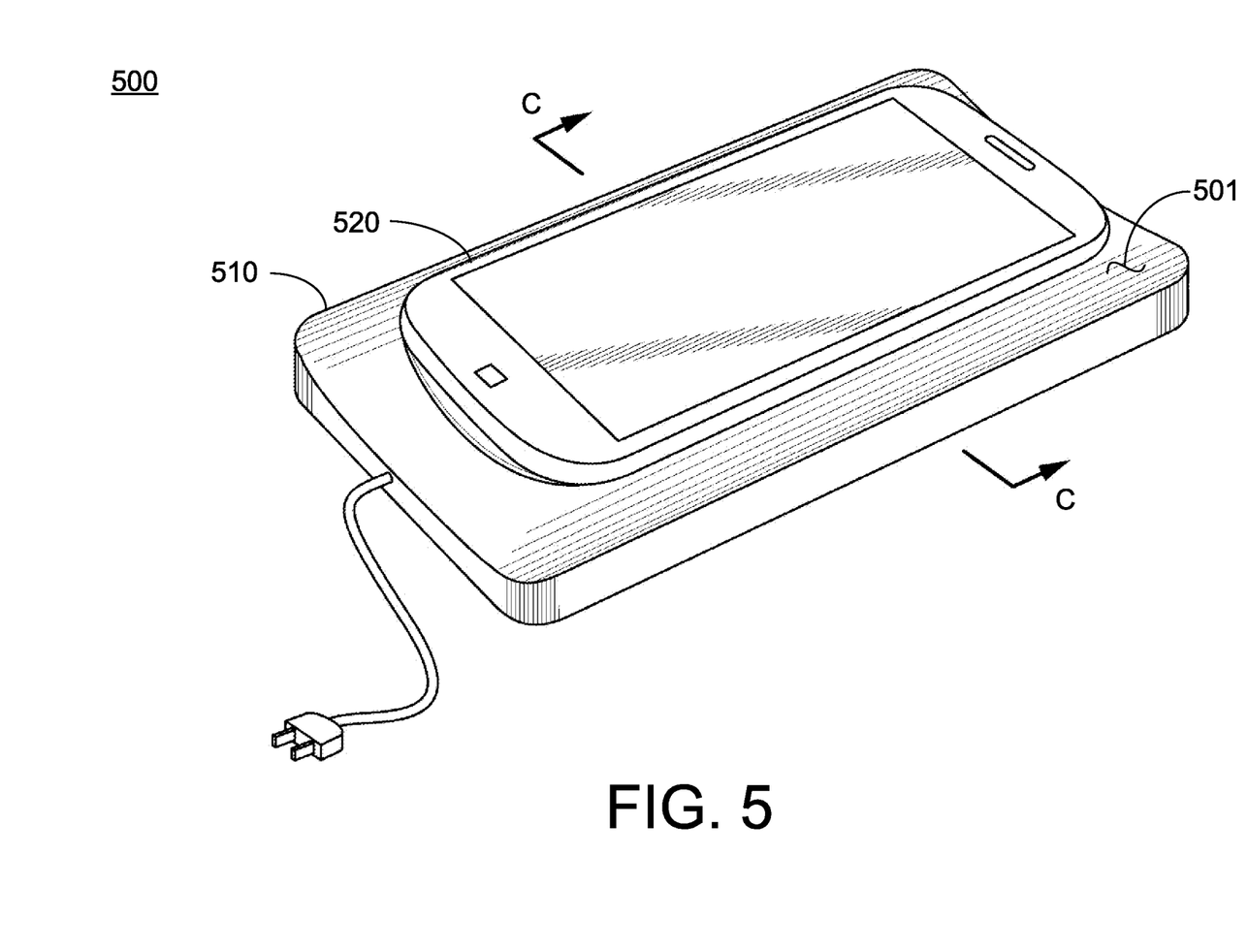
FIG. 5 depicts an example of an inductive charging system having a contoured interface surface.

FIG. 5 depicts an example of an inductive charging system having a contoured interface surface. As shown in FIG. 5, the inductive charging system 500 includes a base device 510 having an upper surface 501 configured to interface with a mobile device 520. In this example, the upper surface 501 is contoured in shape. The mobile device 520 may also have a mating contoured surface and may be placed on the upper contoured surface 501 of the base device 510 during a charging or docking operation. As discussed above with respect to FIGS. 1 and 2 above, both the base device 510 and the mobile device 520 are configured to transfer electrical power via an inductive coupling interface that facilitates an electrical power transfer and other electrical signal transfer between the two components.

Figure 6:
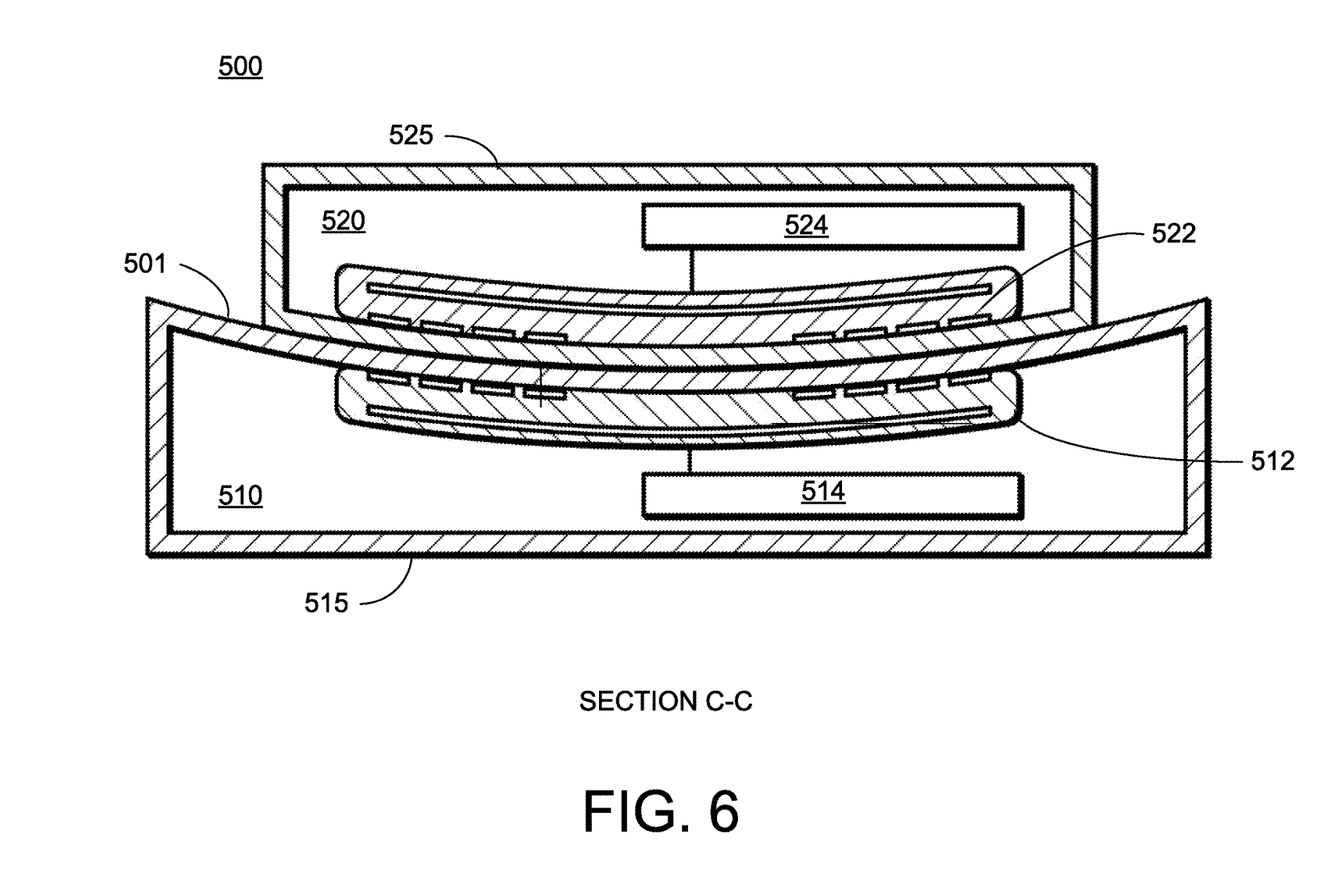
FIG. 6 depicts a cross-sectional view of an example of an inductive charging system having a contoured interface surface.

FIG. 6 depicts a cross-sectional view of an example of an inductive charging system having a contoured interface surface. In particular, FIG. 6 depicts the inductive charging system 500 of FIG. 5 taken along Section C-C. As shown in FIG. 5, the inductive charging system 500 includes a base device 510 configured to physically interface or dock with the mobile device 520 along an interface surface 501 of the base device 510. The mobile device 520 may also have a surface that is specially configured to mechanically interface with, or substantially conform to, the interface surface 501 of the base device 510. As mentioned previously, there may also be one or more alignment features that facilitate alignment of the mobile device 520 with respect to the base device 510.

As shown in FIG. 6, at least one induction coil is located on either side of the interface between the base device 510 and the mobile device 520. In this example, the inductive charging system 500 includes a mobile induction coil 522 disposed within a housing 525 of the mobile device 520. The inductive charging system 500 also includes a base induction coil 512 disposed within a housing 515 of the base device 510. In the present example, both the mobile induction coil 522 and the base induction coil 512 are injection-molded induction coils.

Similar to as discussed above with respect to previous examples, the base induction coil 512 is configured to create an electromagnetic field that extends beyond the housing 515 of the base device 510 and coupled to the mobile induction coil 522, when the mobile device 520 is located proximate to the interface surface 501. The electromagnetic field created by the base induction coil 512 induces a current flow in the mobile induction coil 522, facilitating electrical power transfer and electrical signal transfer between the base device 510 and the mobile device 520.

As previously discussed, it may be generally advantageous that the two induction coils be positioned as close together as possible to facilitate inductive coupling between the two components. In particular, it may be advantageous for the shape of one or both of the coils to substantially conform to the contour of the mechanical interface between the base device 510 and the mobile device 520. In the present example, the interface between the devices has a contoured shape. In particular, the interface surface 501 of the base device 510 has a generally concave shape and the mating surface of the mobile device 520 has a generally convex shape. As shown in FIG. 5, the base induction coil 512 and the mobile induction coil 522 both have a contoured shape that substantially conforms to the shape of the interface surface 501. This configuration facilitates electromagnetic coupling between the two induction coils and also reduces or eliminates significant gaps between the components.

As shown in FIG. 6, the wall thicknesses of the base device housing 515 and the mobile device housing 525 have a substantially even thickness. Thus, the shape of the inner surface of the relative housings also substantially conform with the interface surface 501. In an alternate embodiment, a non-uniform wall thickness or other internal feature may cause the inner surfaces of the housings have a shape that does not substantially conform to the interface surface between the devices. In this case, the induction coils may have a shape that substantially conforms to the shape of the inner surface and not with the interface surface. More generally, by molding the induction coils in accordance with the techniques described herein, one or more of the induction coils may substantially conform with a variety of geometries of contoured surfaces.

Similar to as discussed above with respect to FIG. 2, the base device 510 may include a coil drive circuit 514 and other circuitry that are electrically and operatively coupled to the base induction coil 512. Similarly, the mobile device 520 may include a coil drive circuit 524 and other circuitry that are electrically and operatively coupled to the mobile induction coil 522. In the present example, the mobile device 520 is a mobile phone device having wireless communication circuitry, a microprocessor, and electronics for providing a graphic user interface. In other examples, the mobile device may include a wearable timekeeping device, a health-monitoring device, a navigation device, a media player device, a wireless telephone handset, a tablet computer system, or a laptop computer system.

As discussed with respect to previous examples, the shield elements of the induction coils 512, 522 may substantially isolate the electronic components of the mobile and/or the base device from the electromagnetic field generated by the induction coils 512, 522.

Figure 7:
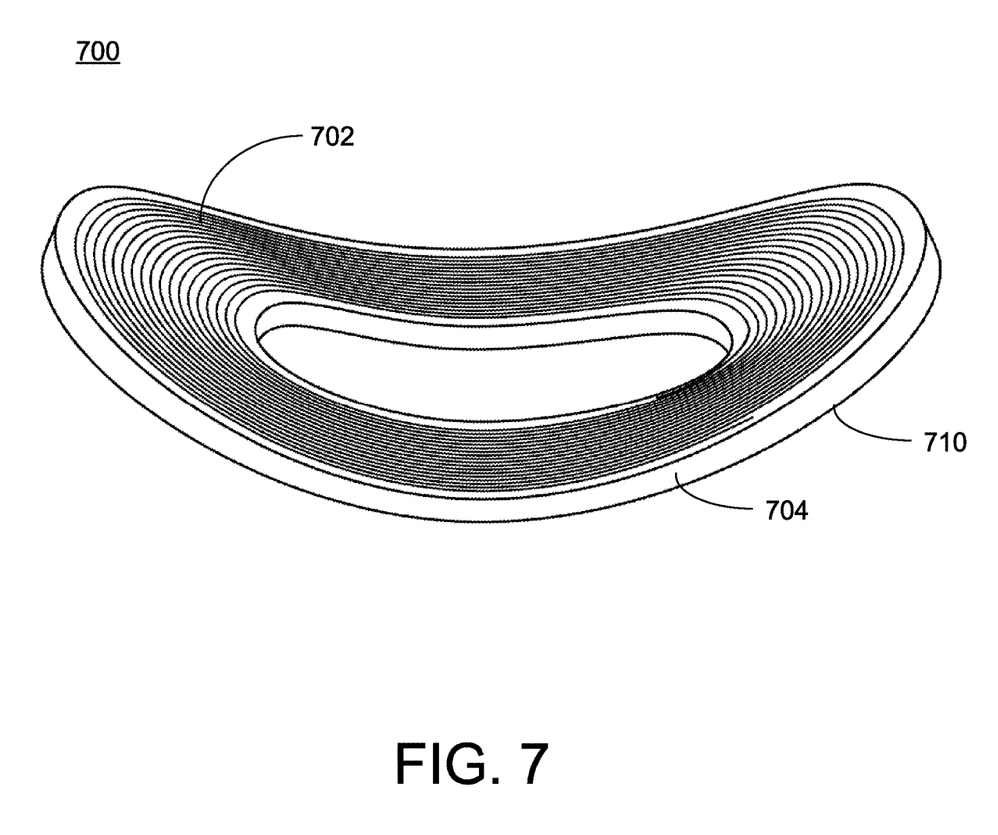
FIG. 7 depicts an example of a molded coil having a contoured surface.

FIG. 7 depicts an example of a molded coil having a contoured surface. The molded coil 700 depicted in FIG. 7 has a generally concave shape and may be used in an inductive charging system similar to the example provided above with respect to FIGS. 4 and 5. The molded coil 700 may be formed from a coil substrate 710 similar to as described above with respect to FIG. 3. In particular, the coil substrate 710 of the molded coil 700 may be injection molded and have one or more shield elements 704 formed within the coil substrate 710 as an insert-molded component. As shown in FIG. 7, the contoured molded coil 700 also includes a conductive winding 702 that is formed within the top surface of the coil substrate 710.

Although the molded coil 700 of FIG. 7 is depicted as disk having a concave shape, in other embodiments, the molded coil may be formed from a variety of shapes, including, without limitation, spherical, cuboid, cylindrical, conical, or other geometric shape. Additionally, the molded coil may be formed from an irregular shape that conforms to the interior volume of an enclosure or housing. Additionally, the molded coil may be formed from a shape that is configured to optimize the creation of an electromagnetic field for electrically coupling to one or more other components.

In some cases, it may be advantageous that the coil may include a shield that is formed from two or more separate elements or a shape that includes a gap or break in the material. In some cases, the shape or configuration of the shield elements are configured to reduce Eddy currents that tend to develop when the induction coil is producing or subjected to an electromagnetic field. The formation of Eddy currents in an induction coil may generate unwanted heat and may also reduce the overall efficiency of the induction coupling. By using a shield comprising multiple components, one or more conductive breaks or gaps may be formed between the separate shield components. Alternatively, the shield may be shaped to include gaps or breaks between sections. The breaks or gaps isolate the shield components or sections of the coil from each other and, thereby reduce the conduction of Eddy currents throughout the induction coil.

Figure 8A:
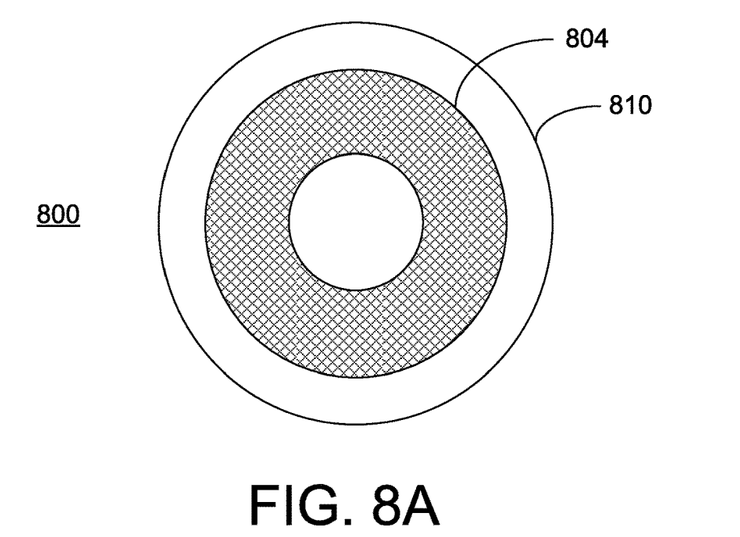
FIGS. 8A and 8B depict example molded coils having an insert-molded shield element.
Figure 8B:
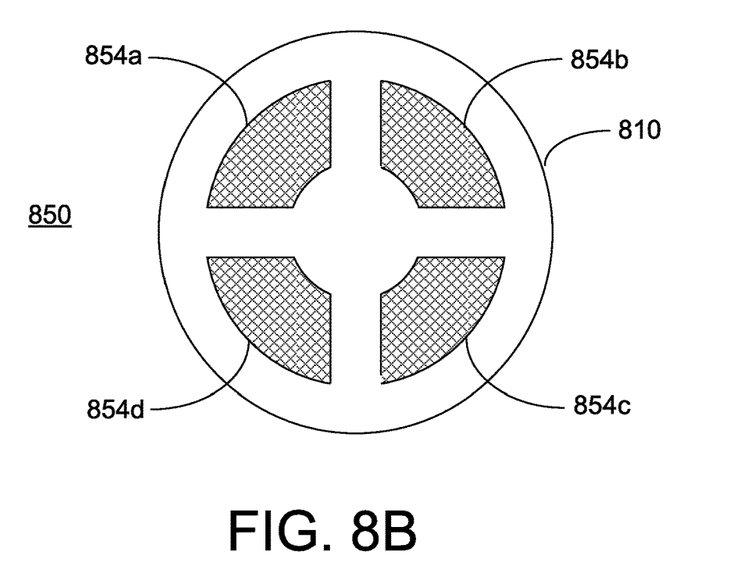

FIGS. 8A and 8B depict example molded coil having an insert-molded shield element. FIG. 8A depicts a cross-sectional view of an example molded coil 800. As shown in FIG. 8A, the molded coil 800 includes a single disk-shaped shield element 804 embedded in a coil substrate 810. Although omitted for clarity, the molded coil 800 may also include one or more conductive windings formed on a surface of the coil substrate 810. The disk-shaped shield element 804 may be formed into the coil substrate 810 by, for example, inserting the shield element 804 into a mold and forming the coil substrate 810 around the shield element 804.

FIG. 8B depicts a cross-sectional view of another example molded coil 850. As shown in FIG. 8B, the molded coil 850 includes multiple partial semi-circle or arc-shaped shield elements 854a, 854b, 854c, and 854d, that are embedded in a coil substrate 860. Although omitted for clarity, the molded coil 850 may also include one or more conductive windings formed on a surface of the coil substrate 860. The multiple semi-circle or arc-shaped shield elements 854a-d may also be formed into the coil substrate 860 by, for example, inserting the shield elements 854a-d into a mold and forming the coil substrate 860 around the shield element 854a-d.

Figure 9:
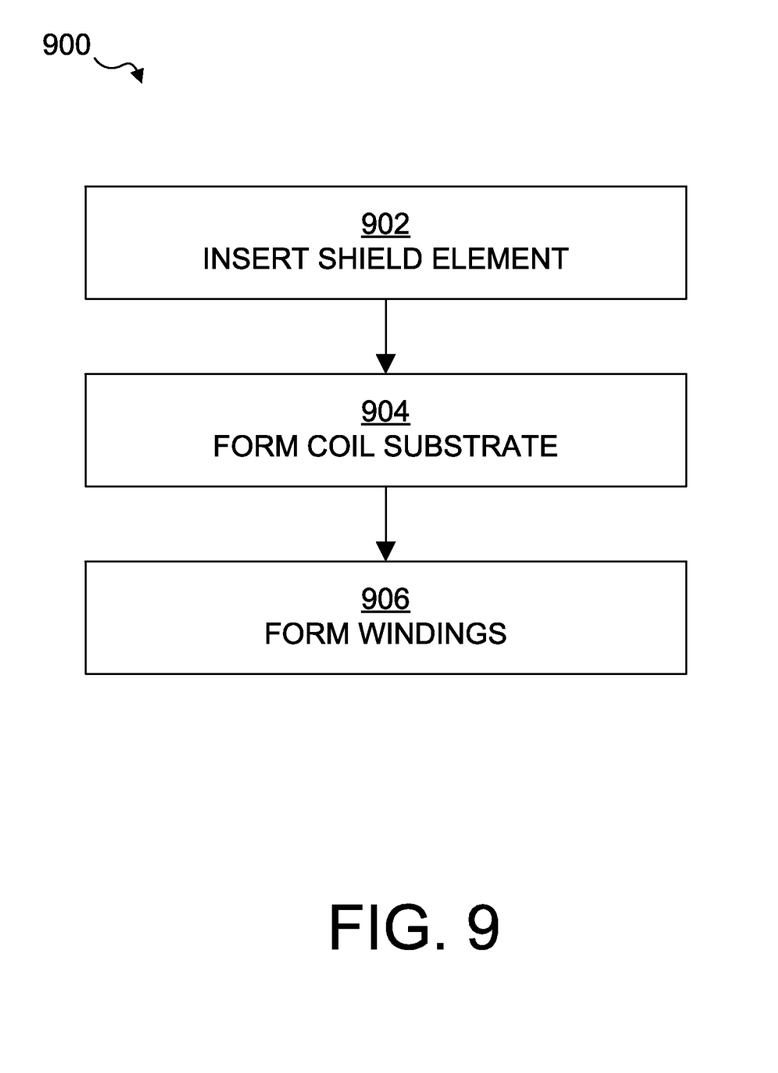
FIG. 9 depicts an example process for forming a molded coil.

FIG. 9 depicts a flow chart of an example process 900 for making a molded coil. The process 900 of FIG. 9 may be used to form, for example, the molded coils described above with respect the FIGS. 2, 3, 4, 6, and 7. More generally, the process 900 may be used to form molded coils having a variety of shapes and geometries, including, without limitation, spherical, cuboid, cylindrical, conical, or other geometric shape. As discussed above, the molded coil may also be formed from an irregular shape that conforms to the interior volume of an enclosure or housing or may be formed from a shape that is configured to optimize the creation of an electromagnetic field for electrically coupling to one or more other components.

In operation 902, a shield element is inserted into a mold cavity or fixture. With regard to an injection molding process, one or both halves of a mold may include a depression or cavity for forming a molded part. The shield element may be inserted into the cavity of one of the mold halves and held in place using a fixture or other retention mechanism. Operation 904 may also apply to other molding processes that do not require two halves to form a mold, such as open pour casting or some vacuum forming processes. With regard to such processes, the shield element may be inserted in a pocket, cavity or fixture of a single mold form.

In operation 904, a coil substrate is formed. In one example, the coil substrate is formed using an injection-molding process. In this case, two halves of a mold are brought together to form an enclosed cavity. In accordance with operation 902, discussed above, the shield element will have already been inserted into one of the mold halves and will now be disposed within the enclosed cavity. The two halves are typically held under a force using a hydraulic piston or other compression mechanism. A molten substrate material is then injected under pressure into the enclosed cavity using one or more injection nozzles or feeds. In some cases, the molten substrate material may flow around the shield element and fill the remainder of the enclosed cavity. In some cases, the shield element is completely immersed in the substrate material. In other cases, portions of the shield element may not be immersed or may remain exposed after operation 904 has been completed.

Example molten substrate materials include, without limitation, polystyrene, polypropylene, polyamide, urethane, and other materials that may be in molten form when heated. Additionally, other molten substrate materials may be in molten form when relatively cool and may be mixed with one or more other materials to induce curing or hardening of the molten substrate material. In some cases, the molten substrate material is also doped with a conductive particulate material. As discussed above, using a doped material may facilitate the formation of conductive windings in the surface of the solid part.

With regard to operation 904, once the enclosed cavity has been filled, the substrate material may be cured or hardened to form a solid part also referred to herein as a coil substrate. With regard to an injection molding process, the molten substrate material may be cooled and allowed to at least partially solidify before the two halves of the mold are opened. In other examples, a chemical reaction between two or more materials may the substrate material to harden and form the solid, coil substrate.

In operation 906, a conductive winding is formed in a surface of the coil substrate. In one example, one or more conductive winding may be formed by treating or activating a region on the surface of the coil substrate and then coating or plating the region with a conductive material. In one example, a region of the coil substrate is activated using a laser beam focused on the surface of the substrate. If the coil substrate is formed from a suitable material, the laser activation prepares the surface of the coil substrate for a subsequent plating or coating process. In some examples, an electroless copper or nickel plating process is used to deposit conductive material on the activated region to form a solid conductive trace. Alternatively, a conductive material may be deposited using a vapor deposition, sputtering, or other deposition process. By using a focused laser beam to activate regions on the surface of the coil substrate, a wide variety of conductive trace geometries can be created.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. An induction coil assembly, comprising:
   an electrically insulative coil substrate;
   a shield element encapsulated within the electrically insulative coil substrate; and
   an electrically conductive winding configured to couple an electrical field between a base device and a mobile device in an inductive charging system, the electrically conductive winding extending across an external surface of the electrically insulative coil substrate,
   wherein the shield element extends beneath a larger portion of the external surface than the electrically conductive winding occupies.

2. The induction coil assembly of claim 1, wherein the electrically conductive winding is formed from a single conductive trace having a continuous spiral shape.

3. The induction coil assembly of claim 1, wherein the electrically insulative coil substrate is formed from a thermoplastic material that is doped with a conductive particulate.

4. The induction coil assembly of claim 1, wherein:
   the electrically insulative coil substrate is formed from a thermoplastic material that is configured to be laser activated, and
   the electrically conductive winding is formed by activating a region of the thermoplastic material and depositing a conductive coating on the region to form a solid conductive trace.

5. The induction coil assembly of claim 4, wherein the conductive coating includes a copper plating material.

6. The induction coil assembly of claim 1, wherein the external surface of the electrically insulative coil substrate having the electrically conductive winding formed thereon is contoured in shape.

7. The induction coil assembly of claim 1, wherein the external surface substantially conforms to a mating surface of the base device.

8. The induction coil assembly of claim 7, wherein the mating surface of the base device is an internal surface of a housing device.

9. The induction coil assembly of claim 1, wherein the shield element is an electromagnetic shield of the induction coil assembly.

10. The induction coil assembly of claim 1, further comprising:
    a plurality of shield elements arranged in a circular pattern, wherein each shield element is formed within the electrically insulative coil substrate as part of an injection-molding process, and wherein each of the shield elements has semi-circle shape.

11. The induction coil assembly of claim 1, wherein the shield element is formed from a ferromagnetic material.

12. The induction coil assembly of claim 1, wherein the shield element is formed from an electrical steel laminate material.

13. The induction coil assembly of claim 1, wherein the shield element is configured to substantially shield electrical components from electromagnetic fields generated by the induction coil assembly.

14. The induction coil assembly of claim 1, wherein the induction coil is disposed within a housing of the base device.

15. The induction coil assembly of claim 1, wherein the induction coil is disposed within a housing of the mobile device.

16. An electronic device comprising:
    a housing having a non-planar interface surface; and
    an induction coil assembly positioned within the housing and having a non-planar shape that corresponds to the non-planar interface surface the induction coil assembly being configured to couple an electrical field between the electronic device and a separate device in an inductive charging system, the induction coil assembly comprising:
       an electrically insulative coil substrate having a non-planar external surface;
       a shield element encapsulated within the electrically insulative coil substrate; and
       an induction coil comprising an electrically conductive winding extending across the non-planar external surface of the electrically insulative coil substrate.

17. The electronic device of claim 16, wherein: the electronic device is a wearable device; and
    the non-planar external surface of the electrically insulative coil substrate has a convex shape.

18. The electronic device of claim 16, wherein:
    the electronic device is a base device that is configured to provide a charge for the separate device; and
    the non-planar external surface has a concave shape.

19. The electronic device of claim 16, wherein the non-planar interface surface is configured to receive a mating interface surface of the separate device.

20. An induction coil assembly, comprising:
    a coil substrate formed from a thermoplastic material; and a shield element encapsulated within the coil substrate; and an induction coil comprising a conductive winding formed on an external surface of the coil substrate, the induction coil configured to couple an electric field between a first device and a second device for the inductive transference of electrical energy, wherein the shield element extends beneath a larger portion of the external surface than the conductive winding occupies.

21. The induction coil assembly of claim 20, wherein:

the induction coil assembly is positioned within a housing of the first device;

the housing has a non-planar surface; and the external surface of the coil substrate has a shape that corresponds to the non-planar surface of the housing.

22. The induction coil of claim 21, wherein the first device is a base device that is configured to receive AC power and provide wireless charging to the second device.

* * * * *